United States Patent [19]

Jones

[11] Patent Number: 4,543,027

[45] Date of Patent: Sep. 24, 1985

[54] ROLLER PALLET SYSTEM FOR LOADING VEHICLES ON A TRAIN

[76] Inventor: Michael N. Jones, 4509 Highland Ter., Austin, Tex. 78731

[21] Appl. No.: 540,546

[22] Filed: Oct. 11, 1983

[51] Int. Cl.⁴ .................................................. B65G 67/04
[52] U.S. Cl. .................................... 414/400; 414/234; 414/245; 414/401; 104/29; 104/31; 105/355; 105/377
[58] Field of Search ............... 414/234, 244, 245, 373, 414/390, 391, 392, 395, 396, 398, 400, 401, 572, 573, 584, 585, 679; 105/355, 377, 378; 104/29, 30, 31

[56] References Cited

U.S. PATENT DOCUMENTS

| | | | |
|---|---|---|---|
| 428,093 | 5/1890 | Hammeken | 105/378 |
| 2,058,891 | 2/1935 | Kellett | 280/33.1 |
| 2,146,203 | 2/1939 | Demarest | 105/368 |
| 2,659,318 | 10/1950 | Steins et al. | 105/368 |
| 2,695,568 | 11/1954 | Keith | 105/368 |
| 3,098,456 | 7/1963 | Elsner | 105/377 |
| 3,232,242 | 12/1961 | Krueger | 105/366 |
| 3,484,002 | 12/1969 | Barry | 414/373 X |
| 3,670,664 | 6/1972 | Thornton | 105/377 |
| 3,788,500 | 1/1974 | Lemelson | 414/348 X |
| 3,797,410 | 3/1974 | Blunden | 414/373 X |
| 4,016,991 | 4/1977 | Oldford | 414/400 |
| 4,312,623 | 1/1982 | Allred et al. | 414/286 X |

FOREIGN PATENT DOCUMENTS

| | | | |
|---|---|---|---|
| 1556697 | 7/1970 | Fed. Rep. of Germany | 414/395 |
| 2951271 | 7/1981 | Fed. Rep. of Germany | 414/390 |
| 1280500 | 11/1961 | France . | |
| 0624361 | 7/1981 | Switzerland | 414/395 |

Primary Examiner—Robert J. Spar
Assistant Examiner—Ken Muncy

[57] ABSTRACT

A loading system for loading vehicles onto a railroad car allows passengers to load their own vehicles. Cylindrical rollers are mounted on a loading dock adjacent to the railroad car. The vehicle is driven onto a pallet that is moved laterally toward the railroad car by the rollers. The railroad car has a frame with two levels that can be raised to position each level with the loading dock. A hydraulic ram pushes the pallet with the vehicle onto the frame for loading and pulls them from the frame for unloading.

3 Claims, 7 Drawing Figures

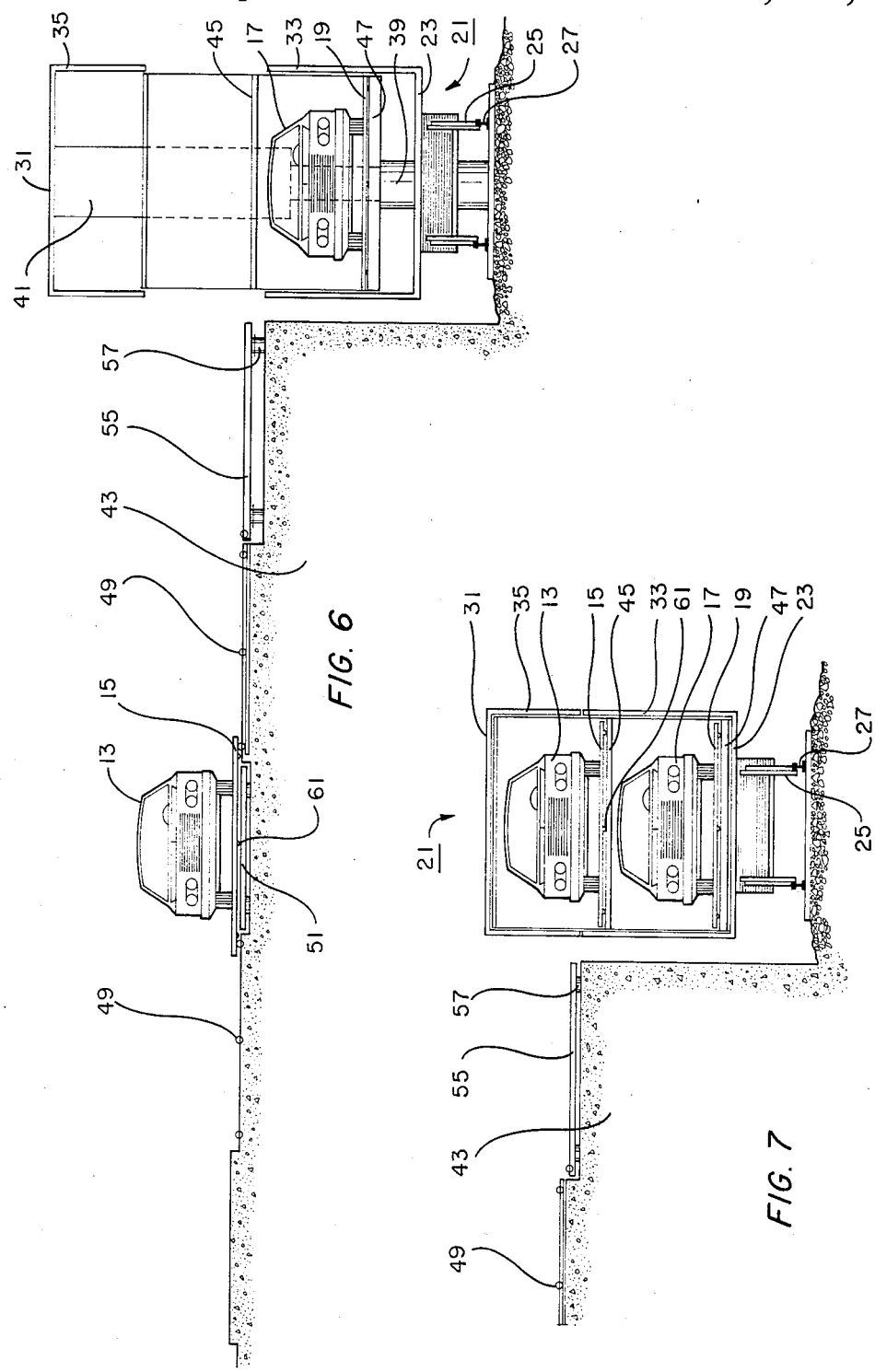

ROLLER PALLET SYSTEM FOR LOADING VEHICLES ON A TRAIN

BACKGROUND OF THE INVENTION

1. Field of the Invention

This invention relates to systems for loading and transporting vehicles, such as passenger automobiles, aboard a railroad car.

2. Description of the Prior Art

It has been recognized for a long time that a major obstacle to the use of public intercity transportation is the lack of destination mobility in a personal automobile. After a trip by plane, train, or bus, a traveler must rent an automobile or use public transit. Renting an automobile is costly and time-consuming and a rented vehicle is usually unfamiliar to the driver. Public transit systems offer minimal service in most communities.

A rail system that permitted passengers to take a personal automobile with them could solve the problem of destination mobility. For such a system to be feasible, passengers would have to be able to load and unload their automobile in minimal time. Also, the system would have to be simple to use and cost-effective.

The most common type of railroad car for transporting automobiles is the enclosed tri-level rack car used for moving new vehicles from assembly plants to major distribution centers. Tri-level racks are loaded sequentially using an inclined ramp. Automobiles are driven by terminal employees up the ramp and through a series of coupled cars until the first level of all the cars has been filled. Then the process is repeated for the second and third levels.

This system for moving automobiles by rail is far from optimum. The loading process is costly and slow and there is frequently damage to the vehicles from having to negotiate the inclined ramp and the narrow interior of the railroad cars. Also, despite repeated attempts to secure vehicles in transit from thieves and vandals, there is still much loss and damage.

The contemporary system for moving new automobiles could be improved by designing a system that would minimize labor costs and loading damage. Such a system would enclose the vehicles in a safe environment, free from unauthorized persons. If a new system could offer fast loading and unloading, it could be used for passenger service.

A number of systems have been designed over the years for improving automobile transport by train. For example, U.S. Pat. No. 2,146,203 (Demarest) shows a method of loading automobiles from the side. Each automobile is driven into the freight car and onto a turntable, which then rotates to align the automobile inside the freight car. The automobile may then be raised to an upper position, so that a second automobile may be loaded below the first.

Over the years since 1939, a number of attempts have been made to improve upon the Demarest design. For example, U.S. Pat. No. 2,695,568 (Keith) shows a method of loading automobiles onto a railroad car using ramps on the side of the car. An automobile is driven up a ramp to a position beside an empty compartment within the railroad car. A rack, upon which the automobile is supported, is then rolled sideways upon a plurality of balls in a plurality of grooves.

In spite of the improvements made over the years, the available loading systems are complex, slow, and costly. There remains a need for a fast and efficient system for loading automobiles aboard railroad cars. Such a system would reduce the cost of transporting new automobiles from assembly plants to distribution centers. It also would facilitate the development of passenger rail service offering automobile transport to travelers desiring destination mobility in a personal automobile.

SUMMARY OF THE INVENTION

The primary object of this invention is to provide a quick and easy method of loading vehicles onto a railroad car.

This object is accomplished by the provision of a roller pallet system. In this system, a specially designed railroad car is parked next to a specially designed loading dock. The railroad car has a base, sidewalls, and a roof which completely encloses a frame which has upper and lower compartments for carrying vehicles. The roof is raised to open the railroad car, and the frame is raised from the car to roughly align one of the empty compartments with the loading dock.

The first automobile to be loaded upon the railroad car is then parked on a pallet, which is supported by a plurality of cylindrical rollers mounted on the loading dock. The cylindrical rollers are then rotated to move the pallet and the automobile laterally toward the railroad car.

The pallet is moved laterally until it rests upon a movable platform on the loading dock next to the railroad car. The platform is lowered to align its top surface with the floor of one compartment of the frame. A horizontal piston then pushes the pallet from the platform into the compartment. The frame can then be raised or lowered so that a second compartment can be loaded with another automobile.

The above as well as additional objects, features, and advantages of the invention will become apparent in the following detailed description.

BRIEF DESCRIPTION OF THE DRAWINGS

FIG. 6 is a sectional end view showing the frame lowered to roughly align the second compartment, and the second pallet being moved laterally toward the railroad car.

FIG. 7 is a sectional end view showing the railroad car loaded and prepared for movement.

DESCRIPTION OF THE PREFERRED EMBODIMENT

Figure 1:
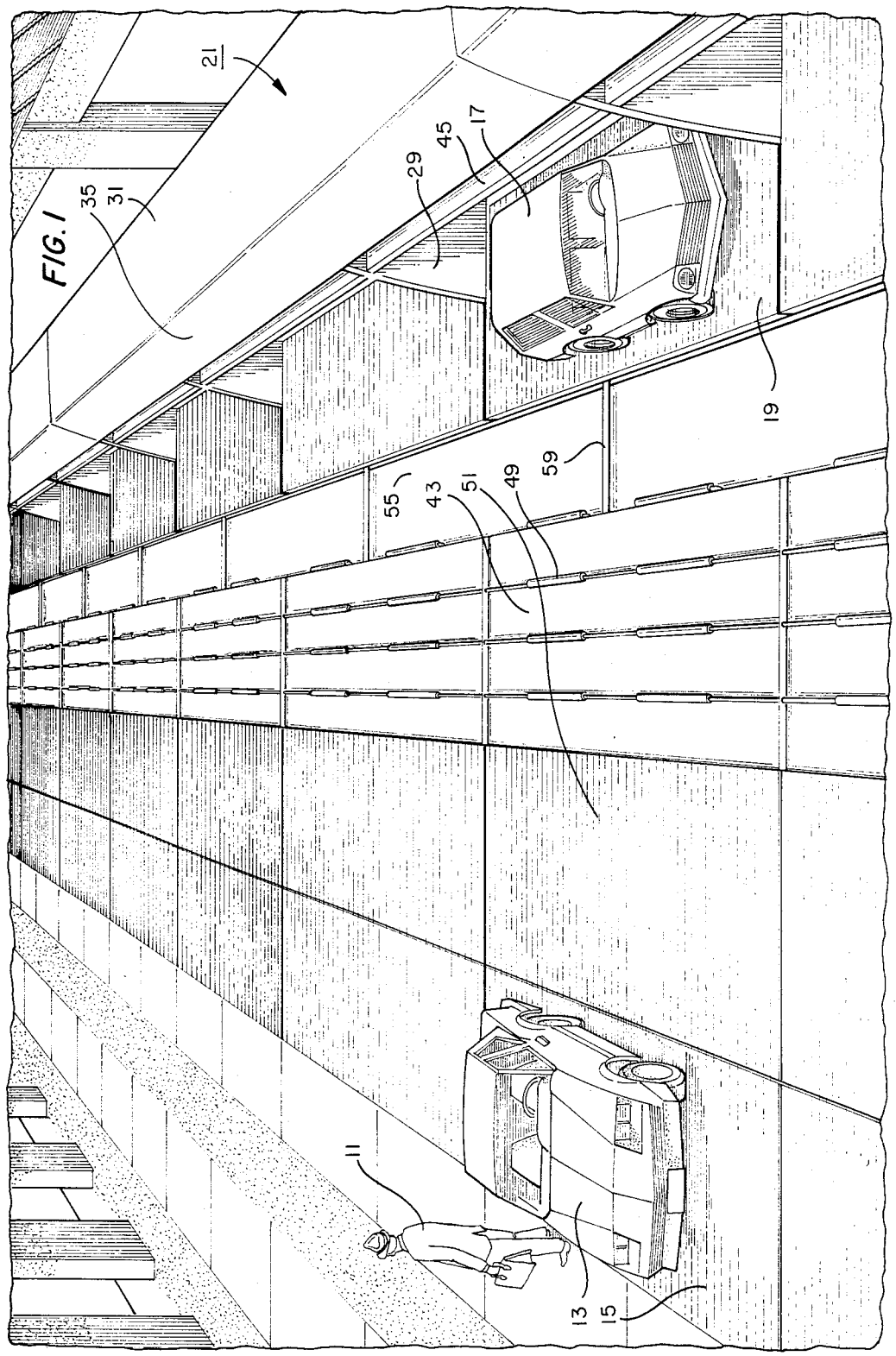
FIG. 1 is a perspective view of the roller pallet system for loading vehicles on a train.

The preferred embodiment of this invention allows train passengers to have their personal automobiles carried on the same train. FIG. 1 is a perspective view of such a system. A passenger 11 has just parked his car 13 on a loading pallet 15. Another automobile 17 and its pallet 19 are being loaded onto the railroad car 21.

Figure 2:
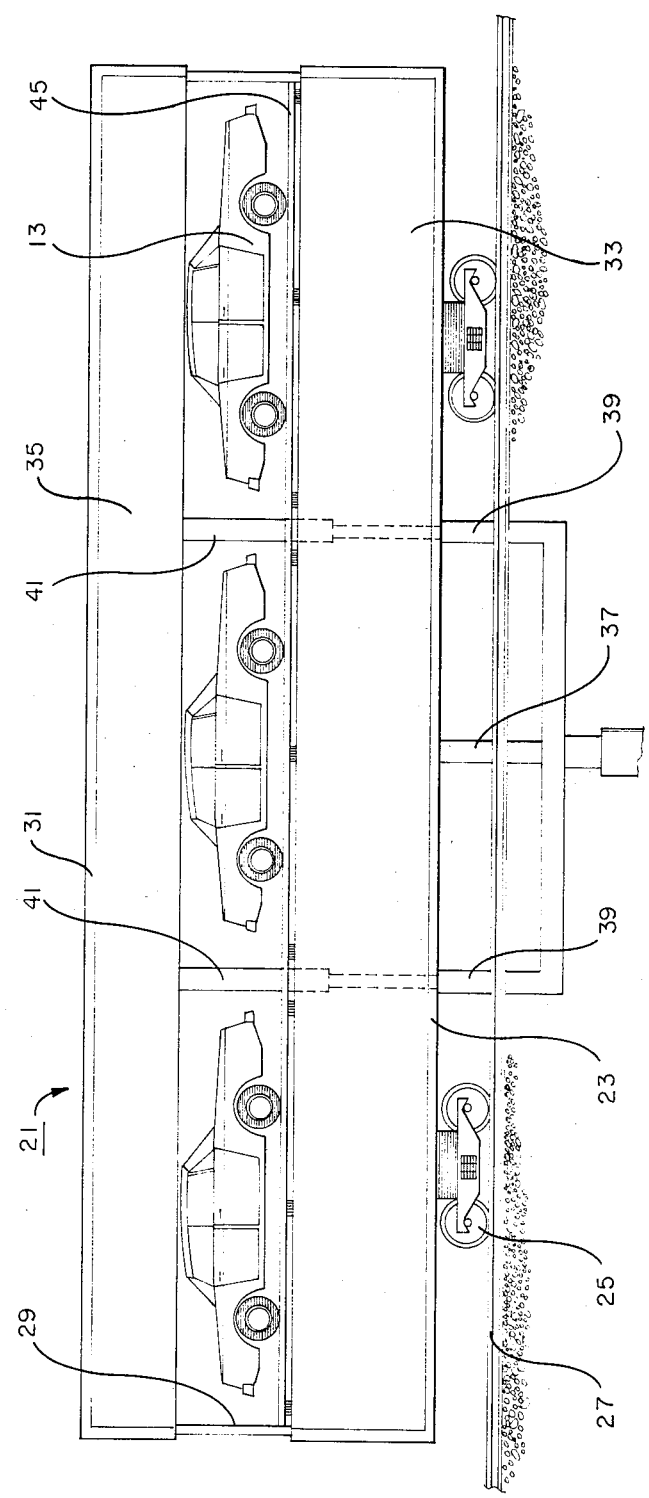
FIG. 2 is a sectional side view showing the railroad car with the frame and roof in the upper loading position.

FIG. 2 shows the railroad car 21 in detail. The preferred railroad car 21 has a base 23 mounted on standard railroad wheels 25, which are supported on rails 27. A movable frame 29 is carried on the base 23, and a movable roof 31 fits over the frame 29. Lower sidewalls 33 extend upward from the base 23, and upper sidewalls 35 extend downward from the roof 31.

A central hydraulic cylinder 37 and a pair of outer hydraulic cylinders 39 permanently mounted below the track and between rails 27 provide lifting means for moving the frame 29 up and down relative to the base 23. An additional pair of hydraulic cylinders 41 extend upward from the outer hydraulic cylinders 39 to provide opening means for removing the roof 31 from the railroad car 21. In FIG. 2, the roof 31 and the upper sidewalls 35 are shown raised to their uppermost position. The frame 29 is in the upper loading position.

Figure 3:
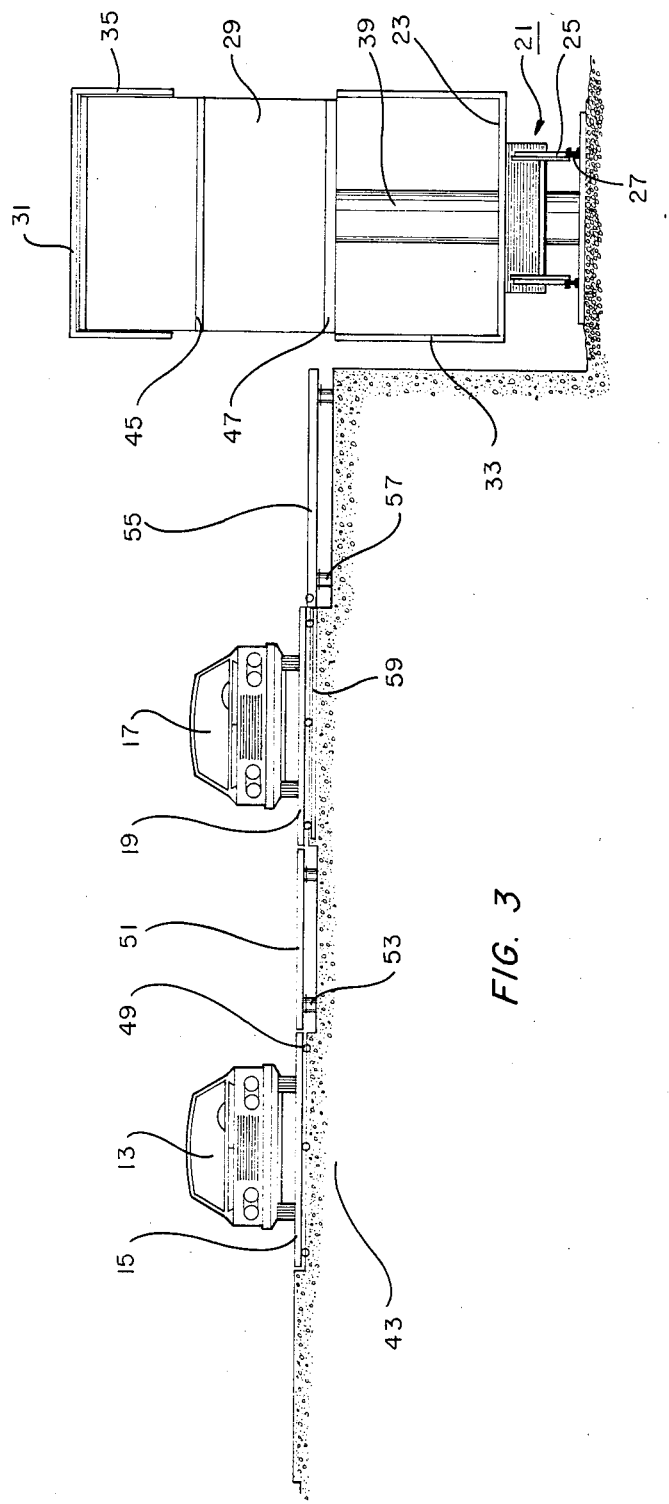
FIG. 3 is a sectional end view showing the roof and frame, with the frame in the lower loading position, and two automobiles parked upon pallets.

FIG. 3 illustrates the components of the conveyor means for moving the automobiles laterally from a loading dock 43 into the railroad car 21. A first automobile 17 has been parked up on a first pallet 19, and a second automobile 13 has been parked upon a second pallet 15. The railroad car 21 has been parked next to the loading dock 43, and the roof 31 and upper sidewalls 35 are resting on the frame 29. The frame 29 has an upper compartment floor 45 and a lower compartment floor 47, and the hydraulic cylinders 37, 39 have raised the frame 29 until the lower compartment floor 47 is located just above the lower sidewalls 33.

The pallets 15, 19 are supported by a plurality of power driven cylindrical rollers 49 which are mounted on the loading dock 43 parallel to the railroad car 21. A movable walkway 51 is mounted on the loading dock 43 by means of hydraulic cylinders 53. The hydraulic cylinders 53 are the walkway elevator means for raising and lowering the movable walkway 51. The upper position of the walkway 51 is even with the pallets 15, 19, and the lower position of the walkway 51 is level with the rollers 49.

A movable platform 55 is mounted on the loading dock 43 adjacent the railroad car 21. Hydraulic cylinders 57 are the elevator means for raising and lowering the platform 55. A horizontal piston 59 is located in the loading dock 43 next to the movable platform 55.

Figure 4:
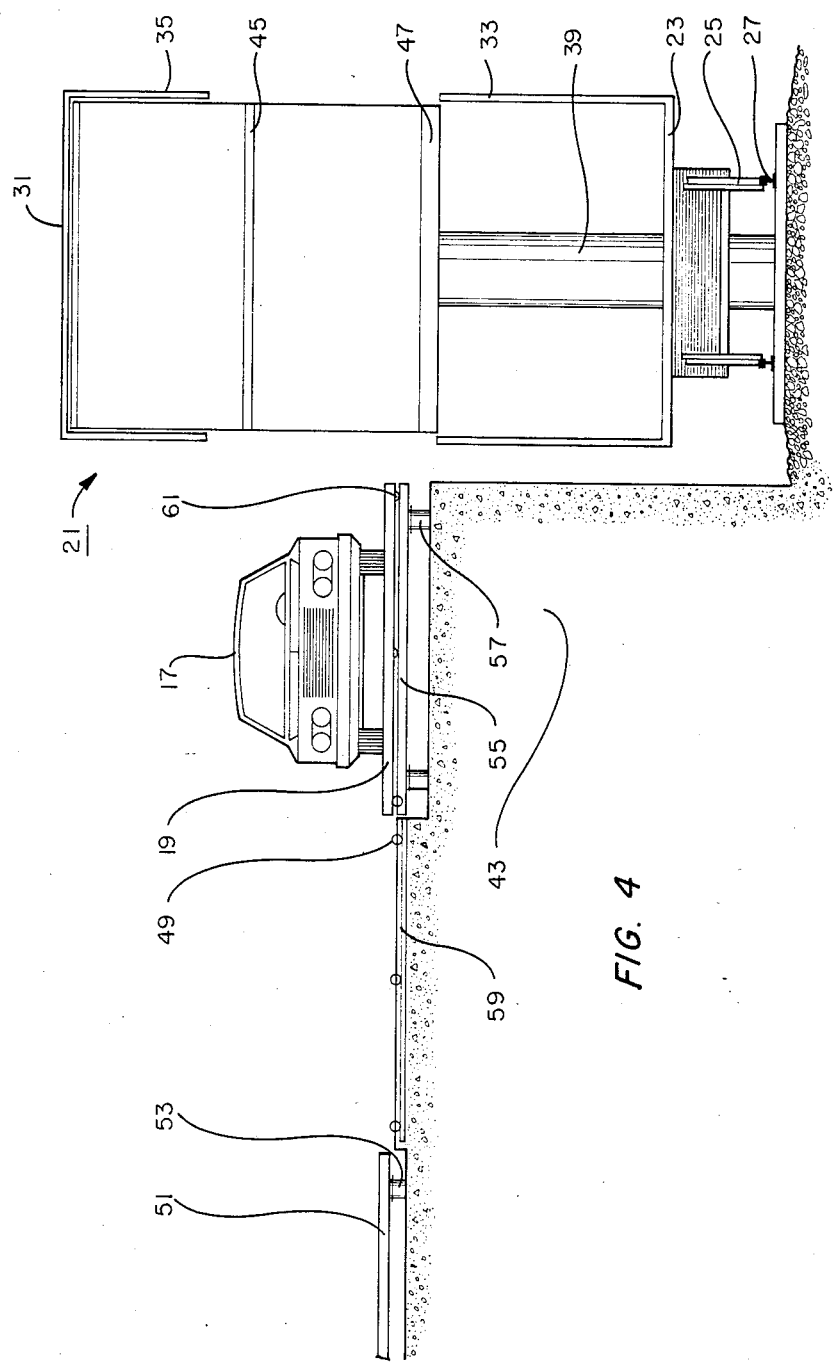
FIG. 4 is a sectional end view showing a pallet supported by the platform in the upper position.

FIGS. 3-7 illustrate the operation of the loading system. After the automobiles 13, 17 have been parked upon the appropriate pallets 15, 19, the situation is as illustrated in FIG. 3. The cylindrical rollers 49 beneath the first pallet 19 are then rotated to move the pallet 19 onto the platform 55. The drive means for rotating the rollers 49 may be any of a number of means well known in the art, such as an electric motor. Once the pallet 19 and the automobile 17 have been moved completely onto the platform 55, the situation is now as illustrated in FIG. 4.

Figure 5:
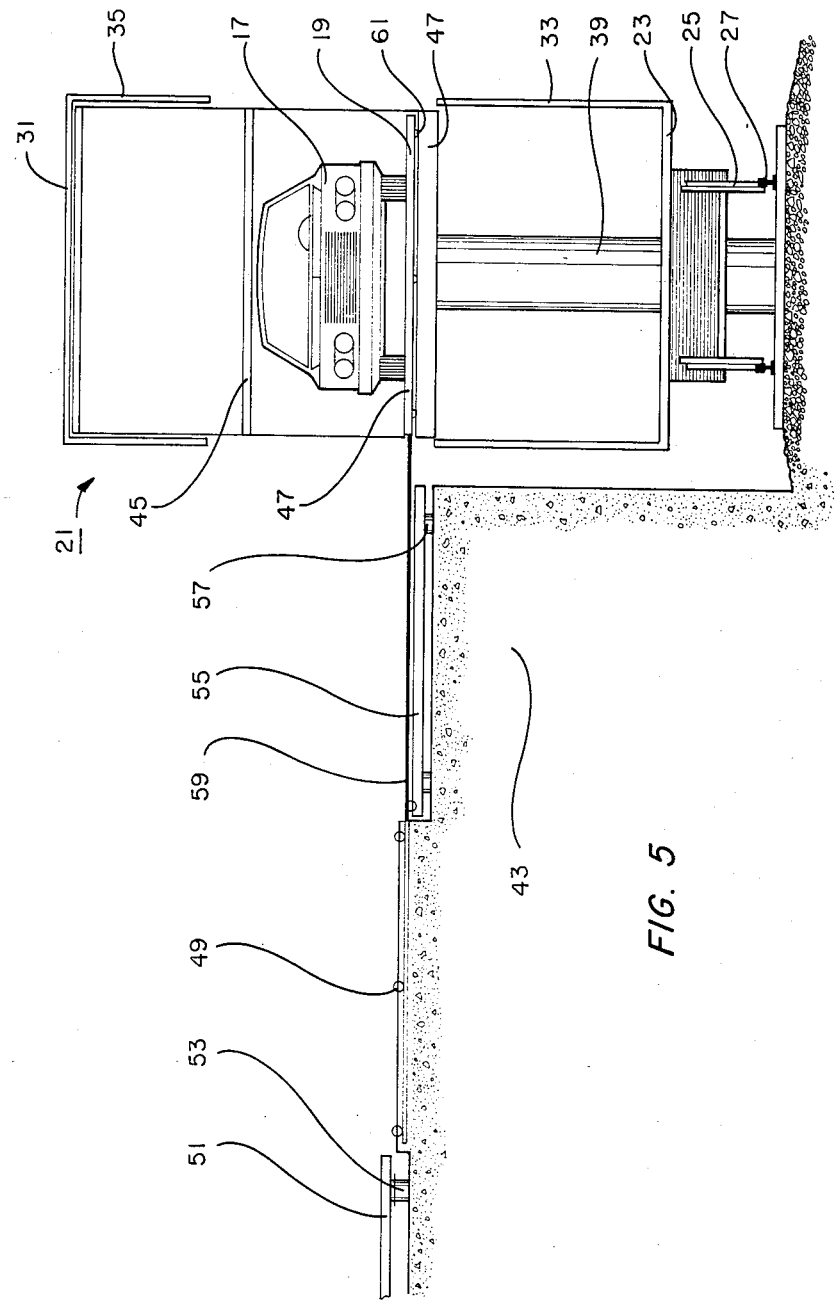
FIG. 5 is a sectional end view showing the pallet being loaded into the lower compartment of the railroad car.

The platform 55 is then lowered by the hydraulic cylinders 57 until the platform 55 is level with the lower compartment floor 47. As illustrated in FIG. 5, the horizontal piston 59 is then used as propellant means for pushing the pallet 19 off the platform 55 and onto the lower compartment floor 47. The pallet 19 is supported upon a plurality of casters 61 in order to facilitate the movement of the pallet 19 across the surface of the platform 55. The horizontal piston 59 is then retracted into the loading dock 43 and the platform 55 is returned to its upper position.

As illustrated in FIG. 6, the frame 29 is lowered until the upper compartment floor 45 is located just above the lower sidewalls 33. The movable walkway 51 is lowered to the level of the cylindrical rollers 49, and the rollers 49 beneath the second pallet 15 begin to rotate. The pallet 15 and the automobile 13 are moved across the walkway 51 and onto the second set of rollers 49. These rollers 49 also rotate to continue the movement of the pallet 15 onto the platform 55. The second pallet 15 and the second automobile 13 are then loaded onto the upper compartment floor 45 in the same manner that the first pallet 19 and the first automobile 17 were loaded onto the lower compartment floor 47. The horizontal piston 59 is then retracted and the roof 31, upper sidewalls 35, and frame 29 are lowered to the transit position. The situation is then as illustrated in FIG. 7, wherein the automobiles 13, 17 are completely covered by the roof 31, the sidewalls 33, 35, and the base 23 of the railroad car 21. The process of unloading the automobiles 13, 17 from the railroad car 21 is in the opposite order of loading. During unloading, a hook (not shown) on the end of the horizontal piston 59 attaches to the pallets 15, 19 in order to pull the pallets 15, 19 off the compartment floors 45, 47 onto the movable platform 55.

The roller pallet system offers a number of advantages over prior art methods for loading automobiles aboard a train. It is possible to load hundreds of automobiles in a matter of minutes in a simple, two-step operation. The system functions automatically after automobiles are positioned on the pallets by their owners, minimizing the need for terminal employees.

The use of pallets permits automobiles to be loaded in compartments only slightly larger than the largest vehicles, saving space and eliminating contact between the vehicles and the railroad car. The latter would abolish vehicle damage experienced through traditional loading procedures.

The method for inserting palletized automobiles in a storage module within the railroad car totally eliminates the possibility of thieves or vandals gaining access to the vehicles. It also would permit the automobile storage module to be carried between the wheels of the railroad car, in a drop-center position, reducing center of gravity and car height. A lower center of gravity ensures stability at higher speeds, facilitating operation in the consist of a fast passenger train. Lower car height would permit freight cars to utilize non-circuitous freight train routings now denied because of overhead clearance problems.

While the invention has been shown in only one of its forms, it should be apparent to those skilled in the art that it is not so limited, but is susceptible to various changes and modifications without departing from the spirit thereof.

I claim:

1. A loading system for loading vehicles onto a railroad car, comprising in combination:
   a base mounted on wheels to be supported on rails and having a lower enclosure extending around the perimeter of the base;
   a frame that is vertically movable relative to the base, the frame being carried on the base and having upper and lower compartments for carrying vehicles;
   an upper enclosure that is vertically movable relative to the base, the upper enclosure fitting over the frame and mating with the lower enclosure to fully enclose the frame;

opening means located below and separate from said railroad car, said opening means extending upwardly for engagement with said upper enclosure for moving the upper enclosure relative to the base and lower enclosure to expose the sides of the compartments for loading;

lifting means located below and separate from said railroad car, said lifting means extending upwardly for engagement with said frame for raising the frame above the lower enclosure to level the compartments with a loading dock, to allow vehicles to be loaded into the compartments, and for lowering the frame with the loaded vehicles onto the base and into the lower enclosure for transporting the vehicles; and means for moving the vehicles laterally from the loading dock into the compartments.

2. A loading system for loading vehicles onto a railroad car, comprising in combination:

a base mounted on wheels to be supported on rails and having a lower enclosure extending around the perimeter of the base;

a frame that is vertically movable relative to the base, the frame being carried on the base and having upper and lower compartments for carrying vehicles;

a upper enclosure that is vertically movable relative to the base, the upper enclosure fitting over the frame and mating with the lower enclosure to fully enclose the frame;

opening means located below and separate from said railroad car, said opening means extending upwardly for engagement with said upper enclosure for moving the upper enclosure upward relative to the base and lower enclosure to an upper position exposing the sides of the compartments for loading, and to a lower position mating with the lower enclosure;

lifting means located below and separate from said railroad car, said lifting means extending upwardly for engagement with said frame for raising the frame above the lower enclosure to an upper loading position leveling the lower compartment with a loading dock, to allow vehicles to be loaded into the lower compartments, and to a lower loading position leveling the upper compartments with the loading dock, to allow vehicles to be loaded into the upper compartments, and to a storage position with the frame resting on the base within the lower enclosure; and means for moving the vehicles laterally from the loading dock into the compartments.

3. A method of loading automobiles onto a railroad car, comprising the steps of:

providing a railroad car with a base, a frame that is vertically movable with respect to the base, the frame having upper and lower compartments for receiving vehicles, and an enclosure that encloses the frame and is vertically movable relative to the base;

positioning the railroad car beside a loading dock;

raising the enclosure to an upper position relative to the base and raising the frame relative to the base to an upper loading position to expose a side of the lower compartment and to position the lower compartment adjacent the loading dock, then moving a vehicle from the loading dock into the lower compartment;

moving the frame relative to the base to a lower loading position to position the upper compartment adjacent the loading dock while the enclosure is in the upper position so as to expose a side of the upper compartment, then moving a vehicle from the loading dock into the upper compartment; and lowering the frame to a storage position onto the base, and lowering the enclosure to a storage position over the frame.

* * * * *